United States Patent
Kim et al.

(10) Patent No.: US 9,338,662 B2
(45) Date of Patent: May 10, 2016

(54) METHOD FOR INTER-BEAM INTERFERENCE REDUCTION USING CROSS POLARIZATION AND METHOD FOR TRANSMITTING/RECEIVING SIGNAL

(71) Applicant: Electronics and Telecommunications Research Institute, Daejeon (KR)

(72) Inventors: Bong Su Kim, Daejeon (KR); Min Soo Kang, Daejeon (KR); Kwang Seon Kim, Daejeon (KR); Woo Jin Byun, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 0 days.

(21) Appl. No.: 14/624,812

(22) Filed: Feb. 18, 2015

(65) Prior Publication Data

US 2015/0351103 A1  Dec. 3, 2015

(30) Foreign Application Priority Data

May 30, 2014 (KR) .......................... 10-2014-0065757

(51) Int. Cl.
*H04W 16/28* (2009.01)
(52) U.S. Cl.
CPC ..................... *H04W 16/28* (2013.01)
(58) Field of Classification Search
CPC ............ H04W 72/082; H04W 72/085; H04W 72/0453; H04W 72/046
See application file for complete search history.

(56) References Cited

U.S. PATENT DOCUMENTS

| | | | |
|---|---|---|---|
| 6,304,762 B1 * | 10/2001 | Myers et al. | ............... 455/562.1 |
| 2004/0198292 A1 | 10/2004 | Smith et al. | |
| 2012/0162008 A1 | 6/2012 | Eom et al. | |
| 2012/0189078 A1 | 7/2012 | Eom et al. | |
| 2013/0202054 A1 | 8/2013 | Khan et al. | |
| 2015/0163004 A1 * | 6/2015 | Harel et al. | ................... 370/278 |

FOREIGN PATENT DOCUMENTS

| | | |
|---|---|---|
| KR | 1020080058805 A | 6/2008 |
| KR | 1020140002403 A | 1/2014 |
| KR | 1020140056561 A | 5/2014 |

* cited by examiner

*Primary Examiner* — Leon Flores
(74) *Attorney, Agent, or Firm* — William Park & Associates Ltd.

(57) ABSTRACT

Disclosed are a method for inter-beam interference reduction using cross polarization and a method for transmitting/receiving a signal. A transmitting method of a base station in a wireless communication system, includes: configuring a first parameter for forming a first beam having first polarization with respect to a terminal located in a first sub-sector, and configuring a second parameter for forming a second beam having second polarization with respect to a terminal located in a second sub-sector; and transmitting a signal to each terminal by forming the first beam using at least one antenna based on the configured first parameter and forming the second beam using the at least one antenna based on the configured second parameter, wherein a frequency band equal to a frequency band of the first sub-sector is allocated to the second sub-sector in a cell in the base station.

19 Claims, 14 Drawing Sheets

(a)

(b)

(a)

(b)

(c)

mur
METHOD FOR INTER-BEAM INTERFERENCE REDUCTION USING CROSS POLARIZATION AND METHOD FOR TRANSMITTING/RECEIVING SIGNAL This application claims the benefit of priority of Korean Patent Application No. 10-2014-0065757 filed on May 30, 2014, which is incorporated by reference in its entirety herein.

BACKGROUND OF THE INVENTION

1. Field of the Invention

The present invention relates to a method for reducing inter-beam interference generated when forming a multiple beam in a wireless communication system, and a method for transmitting/receiving a signal using the same.

2. Related Art

In recent years, as supply and use of mobile devices such as a smart phone and a tablet personal computer (PC) have increased, there is a need for a wireless communication system capable of supporting a plurality of users and obtaining a high transmission rate. To this end, researches and studies have been performed toward a technology of using multiple beams in the same channel. Further, in order to ensure a wide bandwidth, a transmission frequency has been gradually increased to a millimeter wave band. Since the millimeter wave has strong straightness, the millimeter wave is used in a line of sight (LOS) environment, and a small number of the millimeter wave may be reflected, diffracted, and transmitted. For this reason, there is greatly growing interest in a multiple beam antenna technology in the millimeter wave band.

FIG. 1 is a diagram illustrating a cell concept in a base station according to the related art, and FIG. 2 is a diagram illustrating a cell concept of a base station when using multiple beams in the same channel.

In the base station according to the related art, as shown in FIG. 1, when a wave propagation reach zone (hereinafter referred to as 'cell') is displayed as a circle based on the base station, the cell of 360° is divided into three sectors in a unit of 120° and a signal is fully radiated to each sector using an antenna having a beam width of 120°. In this case, in order to reduce interference between sectors, different frequency bands are allocated to sectors, respectively. In addition, similar to the interference between cells, each base station selects different frequencies with respect to a cell overlapping with a neighboring cell. For example, FIG. 1 illustrates a case where a first base station BS1 allocates a first frequency band f1 to a first sector sector1 and a second base station BS3 allocates a third frequency band f3 to a third sector sector3 as the first sector sector1 of the first base station BS1 overlaps with the third sector sector3 of the third base station BS4.

However, when multiple beams are formed in the same channel (that is, the same frequency band), as shown in FIG. 2, each sector is divided into M×N (here, M and N are a natural number) sub-sectors, and a beam corresponding to a specific sub-sector is formed in a terminal located in the specific sub-section.

For example, Korean Patent Publication No. 10-2014-0056561 (published on May 12, 2014) discloses a method for operation of a terminal and a base station in a cellular telecommunication system operating multiple beams. In the method for operation of a terminal and a base station in a cellular telecommunication system operating multiple beams, a plurality of beams are formed, beam identifiers are allocated to the plurality of beams, respectively. After the beam identifiers corresponding to the beams are transmitted using each beam, the beam identifier of the beam selected by the terminal is received from the terminal.

However, since the above method using the multiple beams forms the same number of beams as that of users, a high communication rate may be provided to the users. However, when the inter-beam interference is great, a bad performance is represented as compared with the related art.

SUMMARY OF THE INVENTION

The present invention has been made in an effort to solve the above-described problems associated with prior art. The present invention provides a method for reducing inter-beam interference generated when forming a multiple beam in the same channel using cross polarization.

The present invention provides a method for transmitting/receiving a signal using the method for reducing inter-beam interference.

In accordance with an aspect of the present invention, there is provided a transmitting method of a base station in a wireless communication system, the method including: configuring a first parameter for forming a first beam having first polarization with respect to a terminal located in a first sub-sector, and configuring a second parameter for forming a second beam having second polarization with respect to a terminal located in a second sub-sector; and transmitting a signal to each terminal by forming the first beam using at least one antenna based on the configured first parameter and forming the second beam using the at least one antenna based on the configured second parameter, wherein a frequency band equal to a frequency band of the first sub-sector is allocated to the second sub-sector in a cell in the base station.

According to an aspect, the second polarization is a cross polarization of the first polarization.

According to another aspect, the first beam and the second beam may be fixedly formed at the first sub-sector and the second sub-sector, respectively, and when the terminal located in the first sub-sector moves to the second sub-sector, the first beam formed with respect to the terminal located in the first sub-sector may be switched to the second beam.

According to another aspect, the method may further include receiving a first polarization signal and a second polarization signal from the terminals through the at least one antenna, respectively, after the transmitting of the signal.

According to another aspect, the method may further include: estimating locations and moving directions of the terminals based on the first polarization signal and the second polarization signal, respectively; and selecting polarization of a beam to be formed with respect to the terminals based on the estimated location and moving directions, after the receiving of the first polarization signal and the second polarization signal.

According to another aspect, the moving directions may be estimated by comparing a received signal strength indicator of the first polarization signal with a received signal strength indicator of the second polarization signal.

According to another aspect, the method may further include transmitting information on the selected polarization to the terminals, respectively after the selecting of the polarization of a beam.

According to another aspect, the method may further include moving the beam formed with respect to the terminals based on the estimated locations and moving directions after the estimating of the locations and moving directions of the terminals.

According to another aspect, the method may further include: measuring a received signal strength indicator of the first polarization signal and a received signal strength indicator of the second polarization signal; and forming the first beam and the second beam with respect to a corresponding terminal when the received signal strength indicator of the first polarization signal and the received signal strength indicator of the second polarization signal are equal to or greater than a preset received signal strength indicator, after the receiving of the first polarization signal and the second polarization signal.

According to another aspect, the transmitting of the signal may include forming the second beam in the first sub-sector to transmit data to the terminal located in the first sub-sector using the first beam and the second beam when the number of terminals located in the first sub-sector is equal to or greater than a preset number.

According to another aspect, a frequency band different from the frequency band may be allocated to a cell adjacent to the cell.

In accordance with another aspect of the present invention, there is provided a base station in a wireless communication system, including: a processor which configures a first parameter for forming a first beam having first polarization with respect to a terminal located in a first sub-sector, and configures a second parameter for forming a second beam having second polarization with respect to a terminal located in a second sub-sector; a memory to store the first parameter and the second parameter and a radio frequency (RF) unit which transmits a signal to each terminal by forming the first beam using at least one antenna based on the configured first parameter and forming the second beam using the at least one antenna based on the configured second parameter, wherein a frequency band equal to a frequency band of the first sub-sector is allocated to the second sub-sector in a cell in the base station.

In accordance with another aspect of the present invention, there is provided a method for receiving of a terminal in a wireless communication system, including: transmitting a first polarization signal and a second polarization signal to a base station using at least one antenna; receiving information on selected polarization based on the first polarization signal and the second polarization signal from the base station; selecting polarization for receiving data based on the information on the polarization; and receiving a signal using the selected polarization.

In accordance with another aspect of the present invention, there is provided a terminal in a wireless communication system, including: a radio frequency unit to transmit a first polarization signal and a second polarization signal to a base station using at least one antenna, and to receive information on selected polarization based on the first polarization signal and the second polarization signal from the base station; a processor to select polarization for receiving data based on the information on the polarization, wherein the radio frequency unit receives a signal using the selected polarization.

Since beams having different polarizations are formed between adjacent sub-sectors, inter-beam interference significantly causing performance degradation may be extremely reduced.

Since the terminal receives polarization selection information from the base station, the terminal may efficiently select polarization upon movement between sub-sections.

When the terminal is located at a boundary between sub-sectors, the terminal may represent a high transmission rate by receiving different polarization signals from the base station.

DESCRIPTION OF EXEMPLARY EMBODIMENTS

Figure 1:
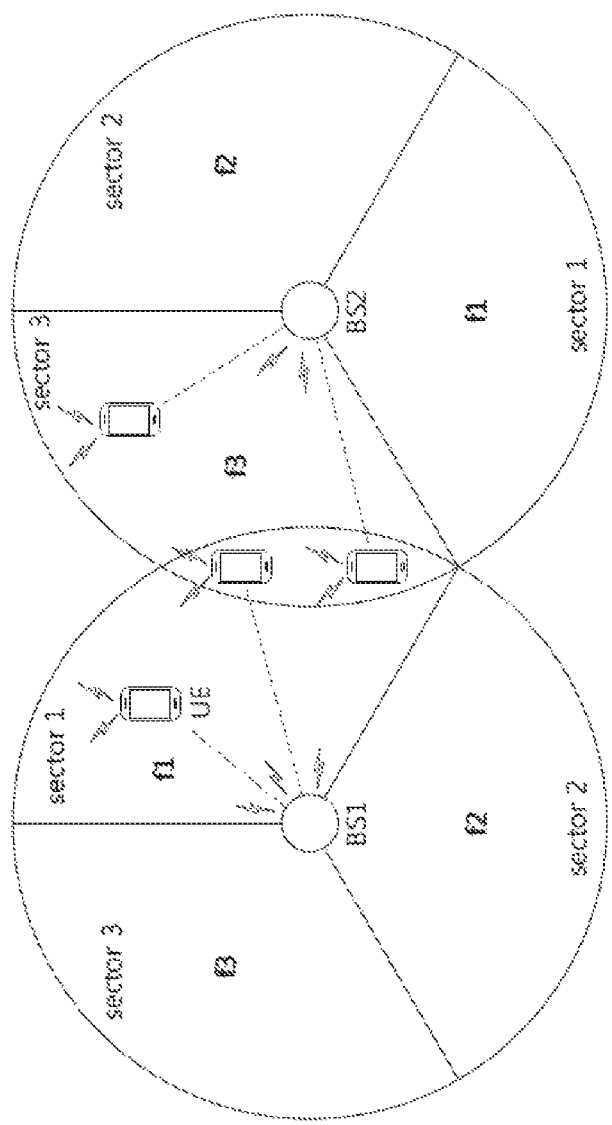
FIG. 1 is a diagram illustrating a cell concept in a base station according to the related art.
Figure 2:
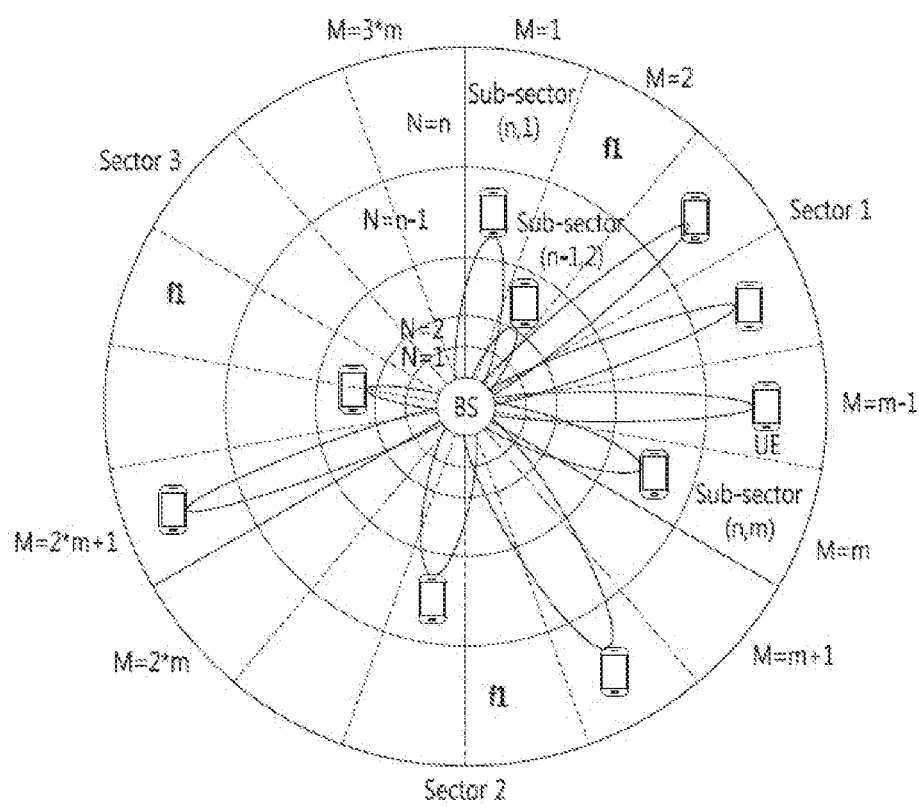
FIG. 2 is a diagram illustrating a cell concept of a base station when using multiple beams in the same channel.

The above objects, features, and advantages can be more clearly comprehended through the following description in relation to accompanying drawings. Accordingly, those skilled in the art can easily realize the present inventive concept. In the following description, if detailed description about well-known functions or configurations may make the subject matter of the disclosure unclear, the detailed description will be omitted. The similar components will be assigned with the similar reference numerals through the specification.

In the following description, when a part is referred to as it includes a component, the part may not exclude other components, but further include another component unless the context indicates otherwise. As used in this embodiment, the term '~ unit' means to perform some functions. The '~ unit' may be implemented by hardware, software, and a combination thereof.

Figure 3:
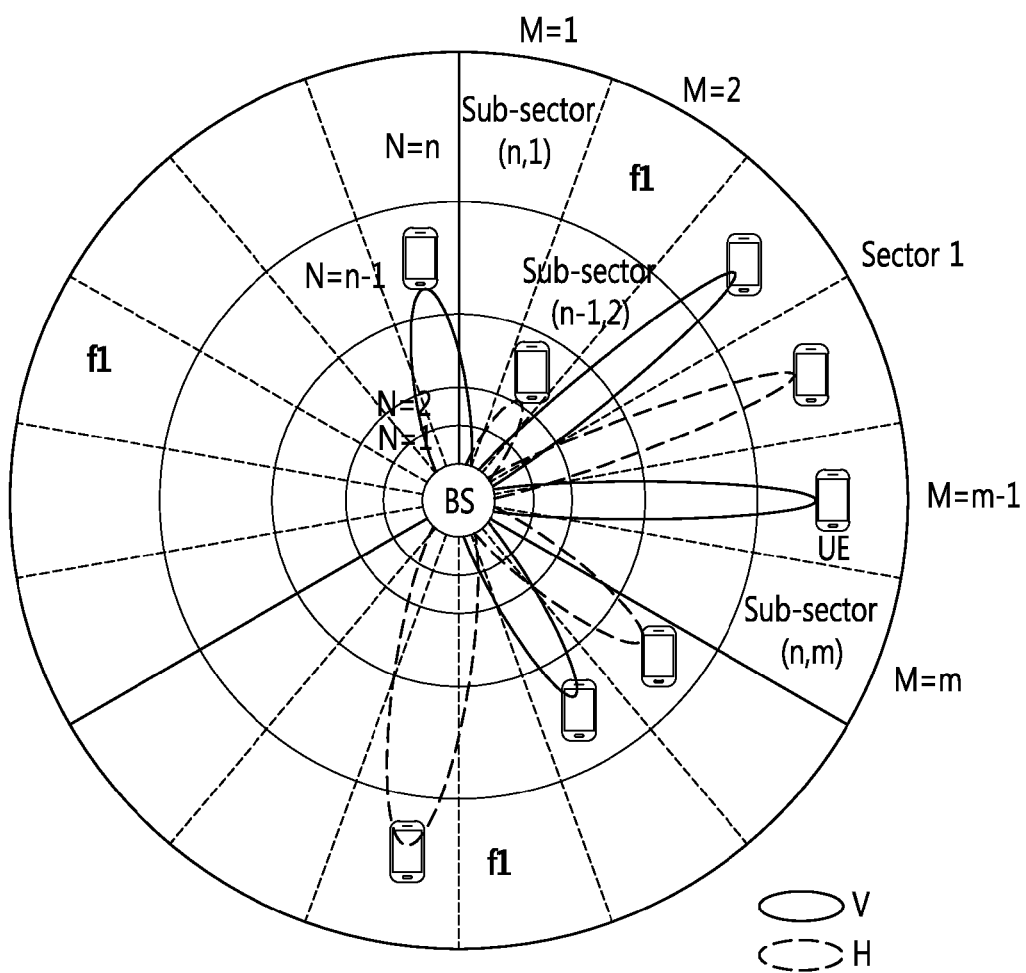
FIG. 3 is a diagram illustrating a cell concept of a base station when using multiple beams in the same channel according to an embodiment of the present invention.
Figure 4:
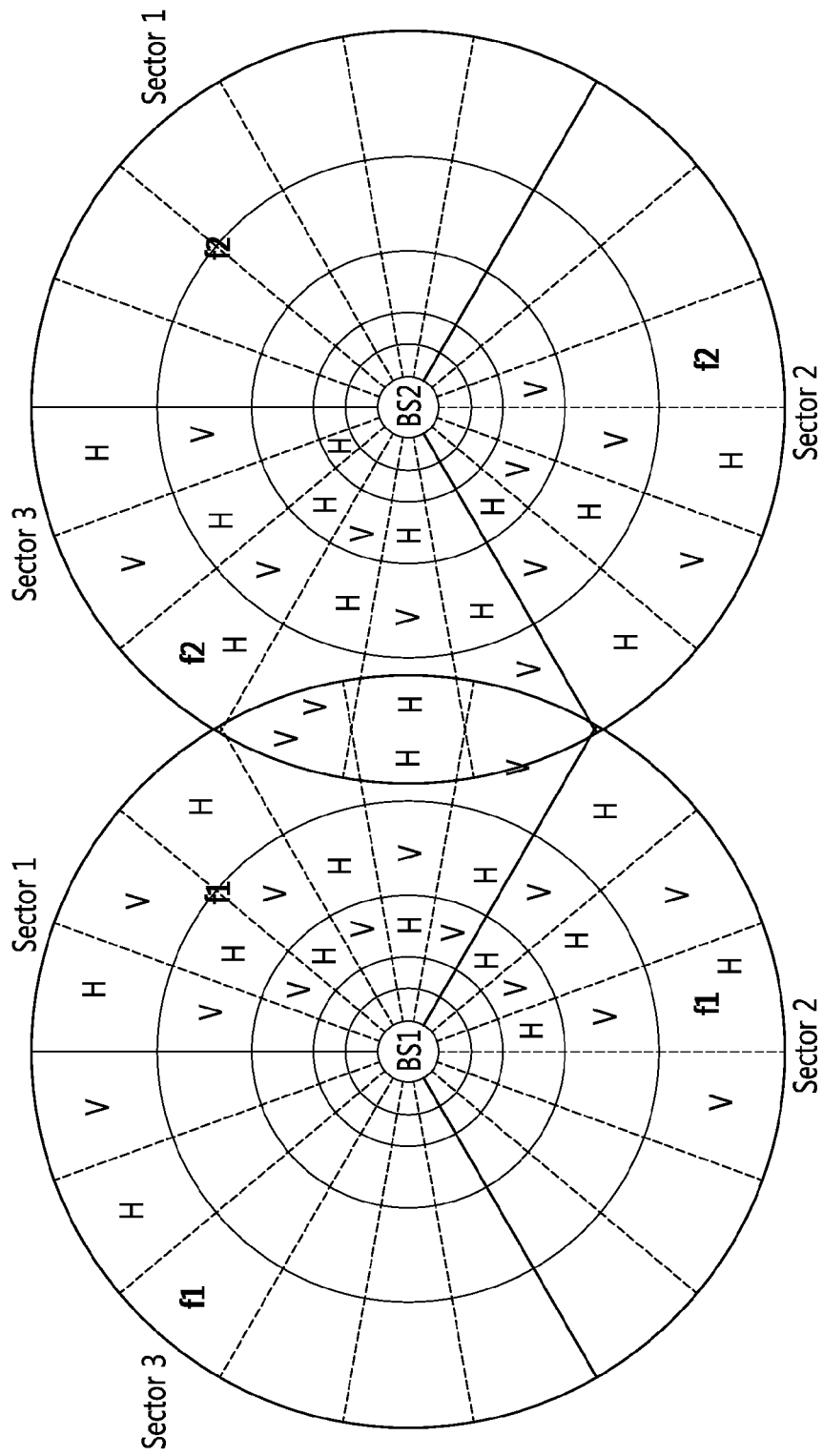
FIG. 4 is a diagram illustrating a cell concept between a base station when using multiple beams in the same channel according to an embodiment of the present invention.

FIG. 3 is a diagram illustrating a cell concept of a base station when using multiple beams in the same channel according to an embodiment of the present invention, and FIG. 4 is a diagram illustrating a cell concept between a base station when using multiple beams in the same channel according to an embodiment of the present invention.

As shown in FIG. 3, a cell of a base station according to the present invention may be divided into three sectors.

Each sector is divided into M×N (here, M and N are a natural number) sub-sectors. The base station may simultaneously form different beams to sub-sectors using at least one antenna, respectively. In this case, a gain and a beam width of each base station antenna may be determined based on various elements such as the number, the geometry, obstacles, and coverage of terminals. For example, the base station may form a beam having a low gain and a wide beam width to a sub-second close to the base station. The base station may form a beam having a high gain and a narrow beam width to a sub-second located away from the base station.

Meanwhile, although FIG. 3 illustrates that one cell is divided into three sectors, one cell may be divided into one or two sectors or may be divided into at least four sectors. Further, although FIG. 3 illustrates a typical shape and size of the sub-sector, the shape and the size of the sub-sector may have various forms according to the geometry and the obstacles.

The base station may allocate the same frequency band f1 to each sector. In this case, the terminal in the cell transmits and receives a signal to and from the base station through the same channel. In this case, the base station, the base station may use different polarizations between adjacent sub-sections in order to minimize inter-beam interference. In this case, the different polarizations may be cross polarization. For example, FIG. 3 illustrates that vertical polarization (V) and horizontal polarization (H) are used between adjacent sub-sectors when linear polarization is used. However, when circular polarization is used, left handed polarization and right handed polarization may be used between adjacent sub-sectors.

In the meantime, when different base stations are adjacent to each other, there may be an overlapping region between cells of each base station. In this case, as shown in FIG. 4, each base station may remove inter-cell interference by allocating different frequency bands to cells, respectively.

Figure 5:
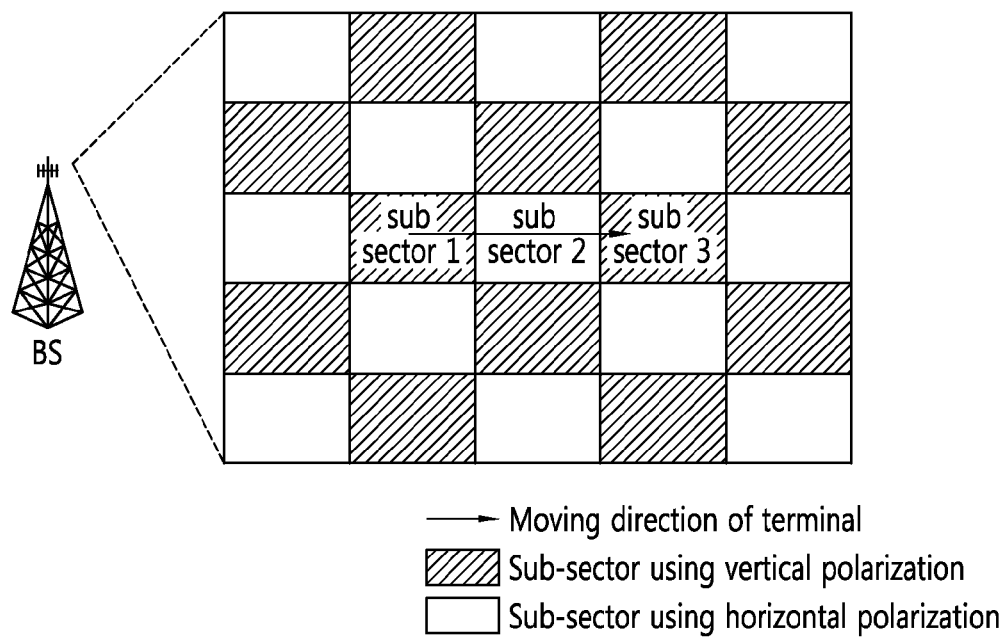
FIGS. 5 and 6 are diagrams illustrating a method for matching polarization of a terminal with polarization of a base station when the terminal moves between sub-sectors according to an embodiment of the present invention.
Figure 6:
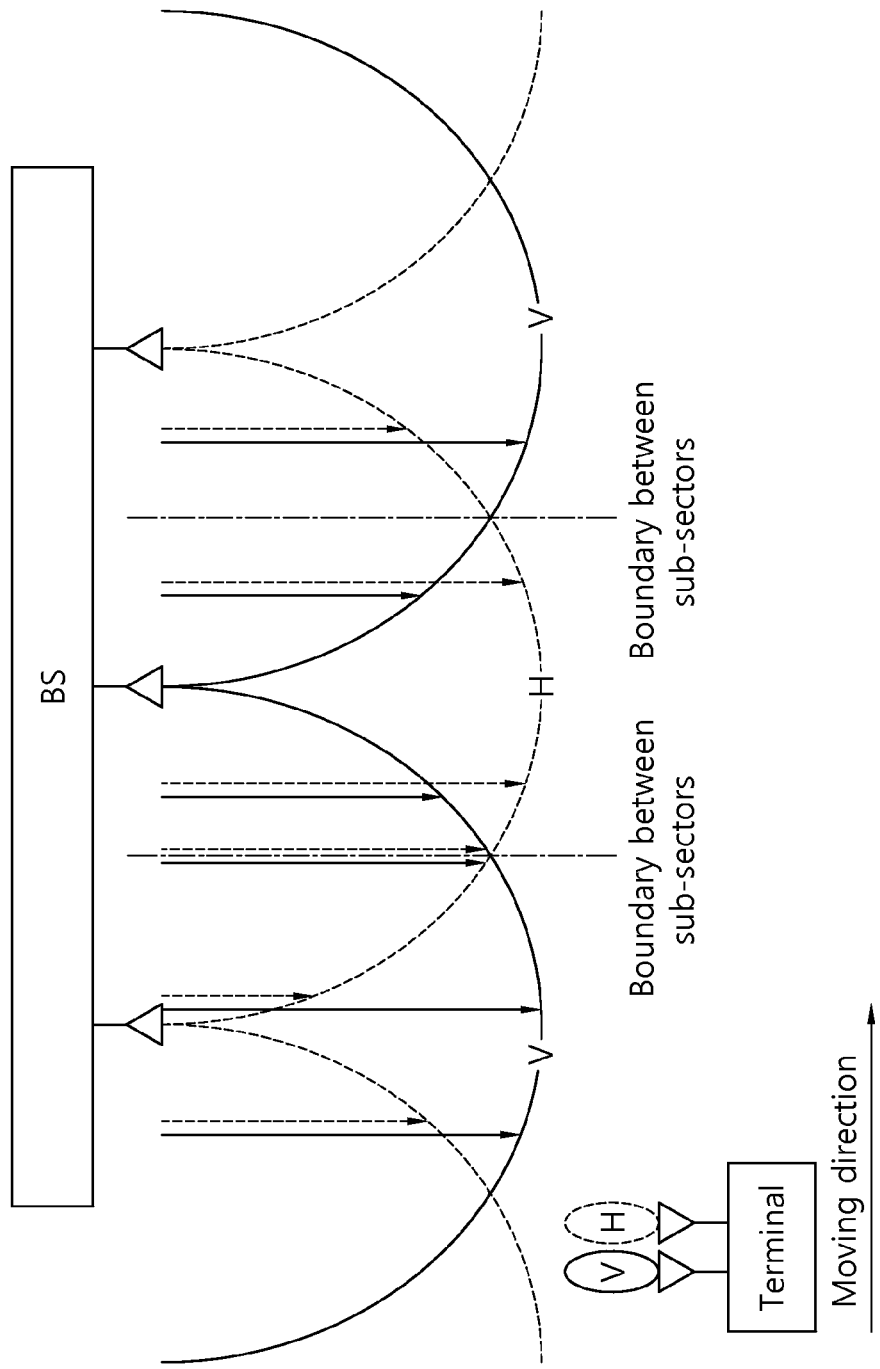

FIGS. 5 and 6 are diagrams illustrating a method for matching polarization of a terminal with polarization of a base station when the terminal moves between sub-sectors according to an embodiment of the present invention.

As described above, if different polarizations are arranged between sub-sectors, inter-beam interference may be efficiently removed. However, in this case, as shown in FIG. 5, when the terminal moves to the third sub-sector from the first sub-sector, the terminal passes through a sub-sector (second sub-sector) using polarization different from currently used polarization. In order to normally transmit/receive data between the base station and the terminal, the terminal and the base station may transmit/receive the signal with the same polarization. Accordingly, the terminal should change the polarization to match polarization thereof with polarization of the base station upon movement between sub-sections, that is, when the terminal moves between sub-sections, that is, moves from the first sub-section to the second sub-sector.

To this end, for example, the terminal may periodically transmit/receive the signal using at least one polarization in order to report a location of the terminal to the base station. The base station may receive signals transmitted from the terminal through each sub-sector antenna, and may systemize a Received Signal Strength Indication (RSSI) of the received signals and collectible information to find out a moving direction of the terminal using a moving direction estimation algorithm. Further, if the terminal reaches a boundary of the sub-sector, the base station may transmit information on whether to maintain or change polarization, or whether to receive both of two polarizations through polarization multiplexing to a corresponding terminal. When receiving the information on the polarization from the base station, the terminal may select the same polarization as that of the base station or select a plurality of polarization to be received.

In detail, referring to FIG. 6, when the terminal is located at a center of a sub-sector using vertical polarization, RSSI of a vertical polarization signal is increased and RSSI of a horizontal polarization signal is reduced. However, when the terminal moves to a boundary of the sub-sector, the RSSI of a vertical polarization signal is slowly reduced and the RSSI of a horizontal polarization signal is rapidly increased. In addition, the vertical polarization signal and the horizontal signal have the same RSSI at a boundary between sub-sectors. Accordingly, the base station may systemize and store the above information to form a beam by taking into consideration a current location and a moving direction of the terminal.

Figure 7:
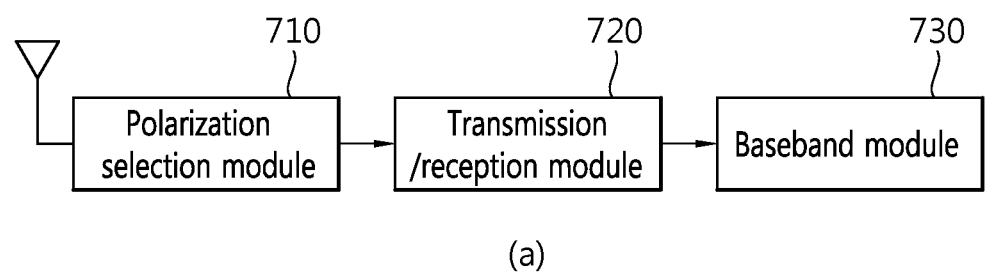
FIG. 7 is a block diagram illustrating a configuration of a terminal according to an embodiment of the present invention.
Figure 7:
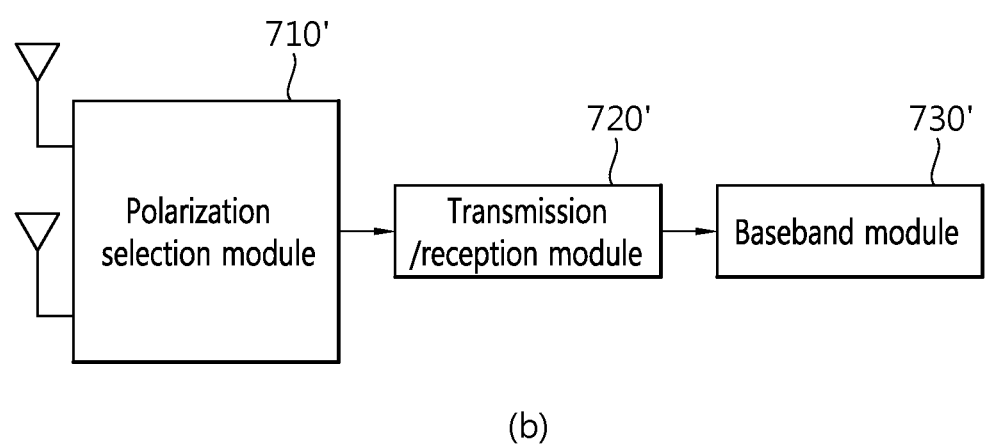
Figure 8:
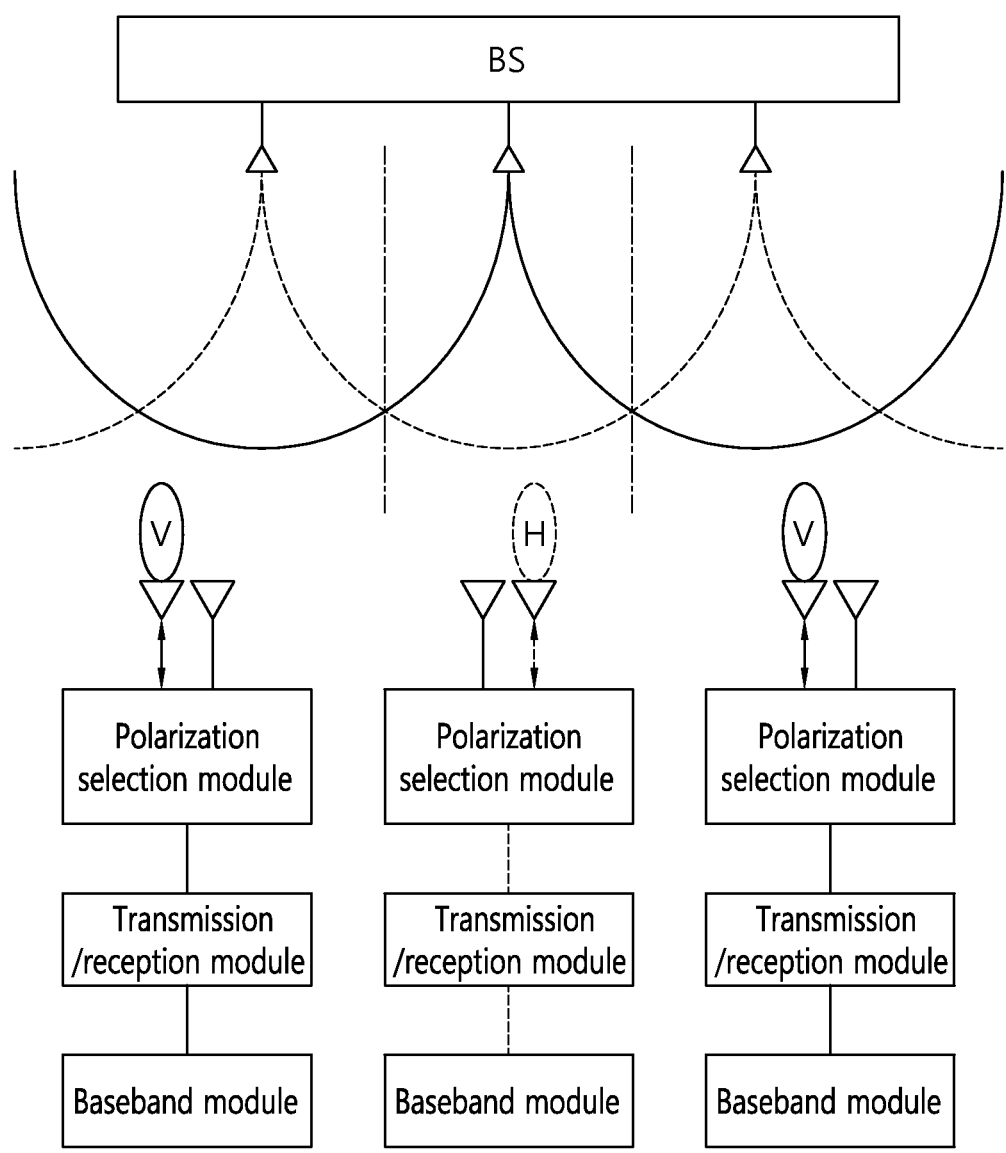
FIG. 8 is a diagram illustrating a transmitting/receiving method when a terminal shown in FIG. 7 moves between sub-sections.

FIG. 7 is a block diagram illustrating a configuration of a terminal according to an embodiment of the present invention;

FIG. 8 is a diagram illustrating a transmitting/receiving method when a terminal shown in FIG. 7 moves between sub-sections.

For example, FIG. 7 illustrates a configuration of a terminal including polarization selection modules 710 and 710', transmission/reception modules 720 and 720', and baseband modules 730 and 730'. The polarization selection modules 710 and 710' may select only one from different polarizations in order to select a signal input/output through an antenna. The transmission/reception modules 720 and 720' transmit/receive the polarization signal selected from the polarization selection modules 710 and 710'. The baseband modules 730 and 730' convert an input signal into a baseband signal.

When the terminal includes an antenna for generating two different polarizations, the terminal may have a structure including only one antenna as shown in FIG. 7(*a*). When the terminal includes a polarization antenna for generating only one polarization, the terminal may have a structure including two polarization antennas as shown in FIG. 7(*b*).

When the terminal shown in FIG. 7 transmits and receives a signal to and from the base station, the terminal may transmit/receive information with only corresponding polarization in a corresponding polarization region using the polarization selection modules 710 and 710' as shown in FIG. 8. In this case, the terminal may periodically transmit two different polarization signals so that the base station may track a moving direction of the terminal. The terminal may change polarization using isolation with respect to different polarizations in itself at a boundary of the sub-sector. In this case, the interference may not be removed. Accordingly, for better performance, the base station tracks a location and a moving direction based on the two different polarization signals. When the terminal is located at a boundary of the sub-sector, the base station may report information on polarization to be selected by a corresponding terminal.

Figure 9:
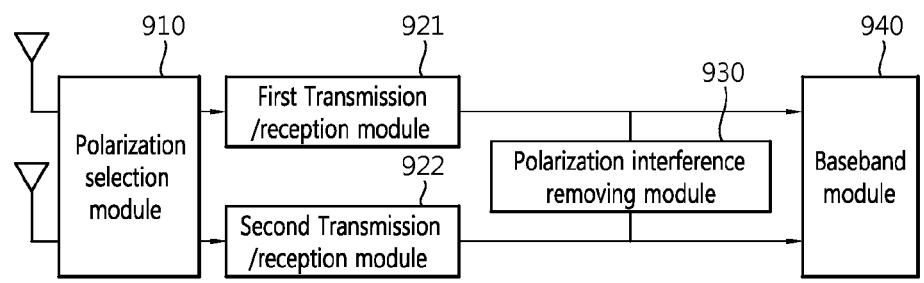
FIG. 9 is a block diagram illustrating a configuration of a terminal according to another embodiment of the present invention.
Figure 9:
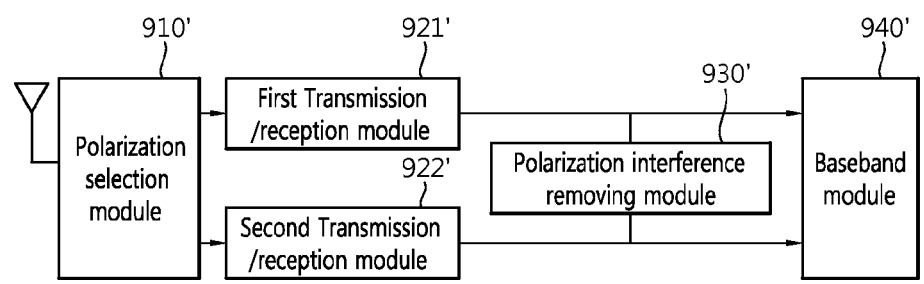
Figure 9:
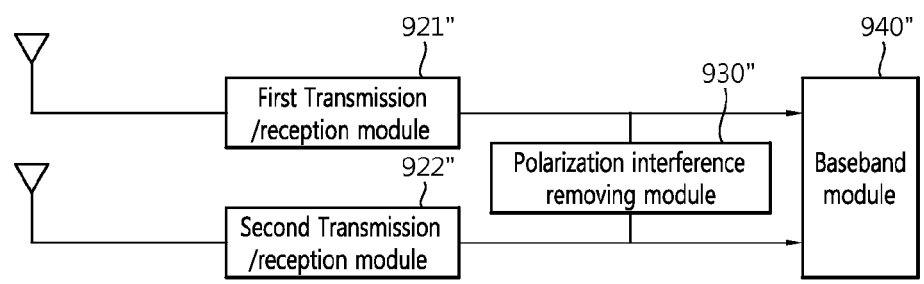
Figure 10:
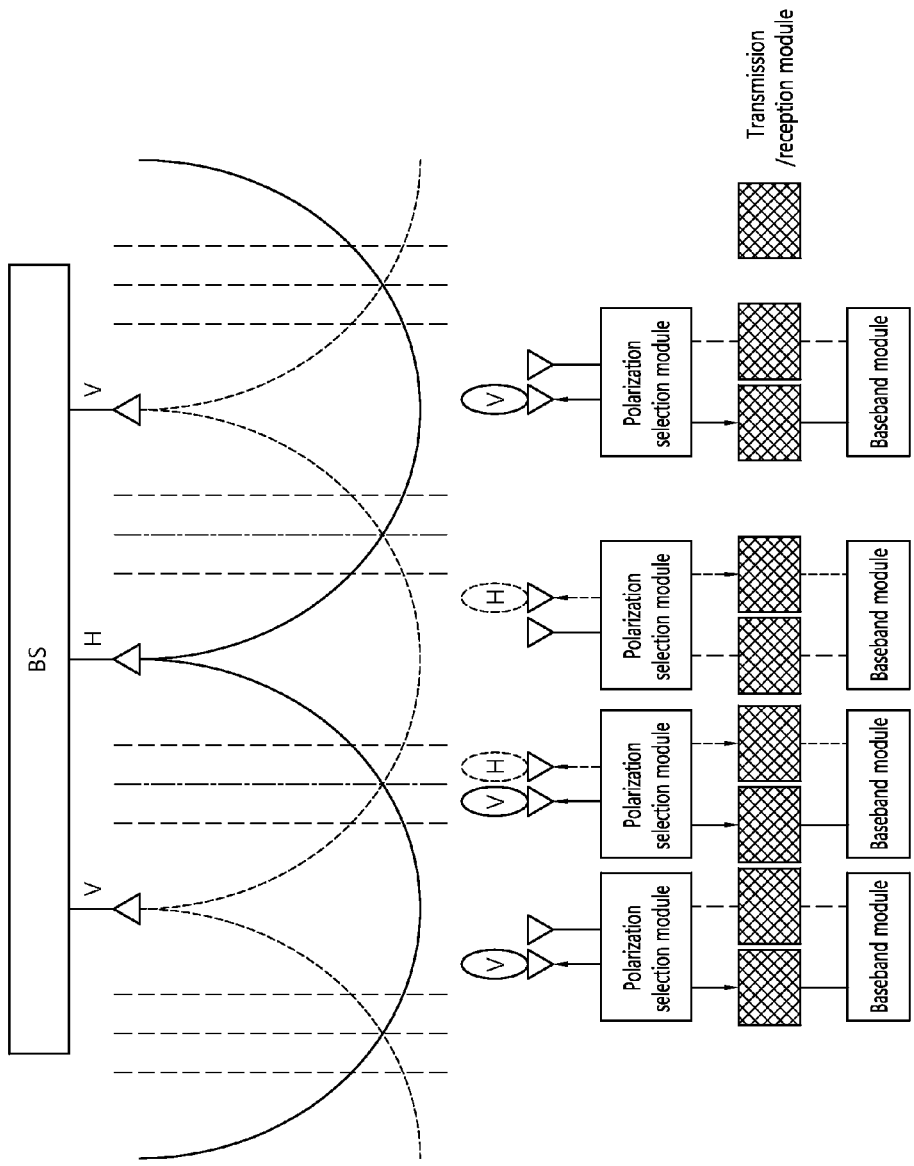
FIG. 10 is a diagram illustrating a transmitting/receiving method when a terminal shown in FIG. 9 moves between sub-sections.

FIG. 9 is a block diagram illustrating a configuration of a terminal according to another embodiment of the present invention, and FIG. 10 is a diagram illustrating a transmitting/receiving method when a terminal shown in FIG. 9 moves between sub-sections.

For example, FIG. 9 illustrates a configuration of a terminal including polarization selection modules 910 and 910', first transmission/reception modules 921, 921', 921", second transmission/reception modules 922, 922', 922", polarization interference removing modules 930, 930', 930", and baseband modules 940, 940', 940". The polarization selection modules 910 and 910' may select one or both from two different polarizations. When one polarization is selected from the polarization selection modules 910 and 910', the terminal transmits/receives a signal with polarization selected using the first transmission/reception modules 921, 921', 921" and the second transmission/reception modules 922, 922', 922". However, both of the two polarizations are selected from the polarization selection modules 910 and 910', the terminal transmits/receives the signal with the two polarizations selected using the first transmission/reception modules 921, 921', 921" and the second transmission/reception modules 922, 922', 922". In this way, the terminal may communicate with the base station by only single polarization by selectively using one transmission/reception module according to a location of the sub-sector or may simultaneously transmit/receive two polarization signals using two transmission/reception modules. When the terminal simultaneously transmit/receive two polarization signals, the polarization interference removing modules 930, 930', 930" may reduce an interference amount between polarizations using a cross polarization interference cancellation (XIPC) algorithm. The baseband module 940 converts an input signal into a baseband signal.

FIG. 9(*a*) illustrates a configuration of a terminal including two polarization antennas for generating only one polarization. FIG. 9(*b*) illustrates a configuration of a terminal including an antenna for generating two different polarizations. FIG. 9(*c*) illustrates a configuration having no polarization selection module so that the terminal may always transmit/receive two polarization signals through two polarization antennas.

When the terminal shown in FIG. 9 transmits and receives the signal to and from the base station, the terminal may communicate with the base station using only vertical polarization at a center of the sub-sector using the vertical polarization as shown in FIG. 10. In this case, since a horizontal polarization signal is small, the terminal may use a high-order modulation scheme using vertical polarization with small interference. However, when the terminal is located closer to a boundary of the sub-sector, the horizontal polarization signal is increased, which represents polarization interference in a single transceiver. However, as shown in FIG. 9, when the terminal includes two transmission/reception modules, the base may apply polarization multiplexing by sending data through a beam of an adjacent sub-sector. The terminal receives data with two different polarizations to solve a problem in that a rate is reduced at a boundary between sub-sectors and to have a higher transmission rate at a boundary between the sub-sectors.

Figure 11:
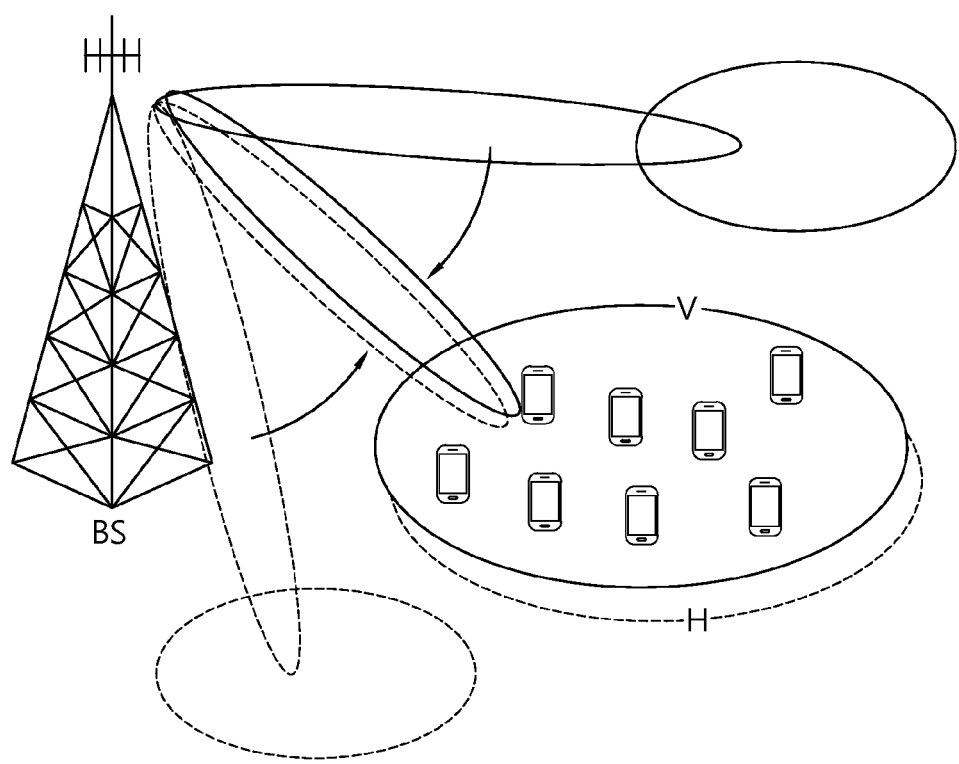
FIG. 11 is a diagram illustrating a method for providing a high transmission rate to the terminal according to an embodiment of the present invention.

FIG. 11 is a diagram illustrating a method for providing a high transmission rate to the terminal according to an embodiment of the present invention.

A base station according to the present invention may communicate with the terminal through adaptive beam-forming or switch beam-forming. The adaptive beam-forming is a technology which forms a desired beam by designating a digital or analog weight factor in real time according to the number of users. The base station allocates one beam to each user based on a beam width narrower than that of an existing beam by performing the adaptive beam-forming. When the user moves, the beam may be operated to be moved according to the user. Meanwhile, the switch beam-forming is a technology which transfers a signal to a desired part by switching a combination of defined beams. In this case, when the terminal is located in a fixed beam, the base station is connected to the terminal by a switch operation. In this case, since the beam formed in the terminal is a fixed beam, an allowable range is determined per beam.

Figure 12:
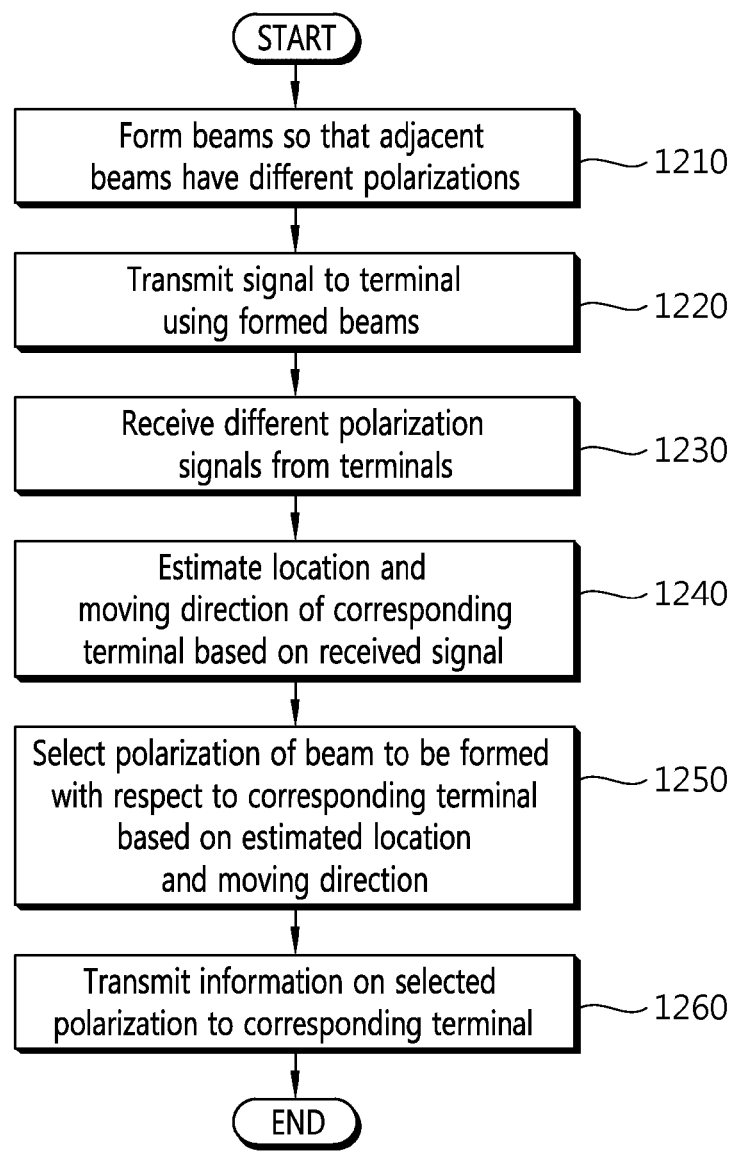
FIG. 12 is a flowchart illustrating a transmitting/receiving method by a base station according to an embodiment of the present invention.

Accordingly, when the terminal is concentrated at a specific location as shown in FIG. 12, the base station moves a beam of an inter sub-sector at a position where a plurality of terminals are located. The base station may increase total capacity by performing polarization multiplexing by adjusting a beam width and a gain according to a desired zone.

FIG. 12 is a flowchart illustrating a transmitting/receiving method by a base station according to an embodiment of the present invention In a wireless communication system, a base station form beams so that adjacent beams have different polarizations (1210), and transmits a signal to the terminal using the formed beams (1220). To this end, for example, the base station may configure a first parameter for forming a first beam having first polarization with respect to a terminal located at a first sub-sector, and may configure a second parameter for forming a second beam having second polarization with respect to a terminal located at a second sub-sector. In this case, the same frequency band as that of the first sub-sector is allocated to the second sub-sector in a cell of the base station and the second sub-sector may be a sub-sector adjacent to the first sub-sector. Further, the second polarization may be cross polarization of the first polarization. For example, in a case where linear polarization is used, if first polarization is vertical polarization, second polarization may be horizontal polarization. In a case where circular polarization is used, if the first polarization is left handed polarization, the second polarization is right handed polarization.

Next, the base station may form the first beam using at least one antenna based on the configured first parameter, and form the second beam using the at least one antenna to transmit the signal to each terminal. In this case, the first beam and the second beam may be fixedly formed in the first sub-sector and the second sub-sector, respectively. In this case, when a terminal located at the first sub-sector moves to the second sub-sector, the first beam formed with respect to the terminal located at the first sub-sector may be switched to the second beam.

Meanwhile, the base station may receive different polarization signals, that is, a first polarization signal and a second polarization from terminals located in a cell through at least one antenna, respectively (1230). For example, the first polarization signal and the second polarization signal may be periodically transmitted to the base station from the terminals, respectively. When the first polarization signal and the second polarization signal are received from the terminals, respectively, the base station estimates a location and a moving direction of a corresponding terminal based on the first polarization signal and the second polarization signal (1240), and may select polarization of a beam to be formed with respect to a corresponding terminal based on the estimated location and moving direction of the terminal (1250). For example, the moving direction of each terminal may be estimated by comparing an RSSI of the first polarization signal with an RSSI of the second polarization signal.

When the polarization of the beam to be formed with respect to the corresponding terminal is selected, the base station may transmit information on the selected polarization with respect to the corresponding terminal to the terminal (1260). For example, the information on the polarization may be transmitted to the corresponding terminal when a specific terminal reaches a boundary between sub-sectors, sectors, or cells. In this case, the corresponding terminal may select the same polarization as that of the base station or a plurality of polarization for reception based on the received information on the polarization.

Meanwhile, when the location and the moving direction of the terminal are estimated, the base station may move the beam formed with respect to each terminal through adaptive beam-forming based on the estimated location and moving direction of the terminal. Further, when the first polarization signal and the second polarization signal are received from the terminal, the base station measures a Signal to Noise Ratio (SNR) of each polarization signal. When the SNR of the first polarization signal to the second polarization signal is equal to or greater than a preset SNR, the base station may perform polarization multiplexing by forming the first beam and the second beam with respect to the corresponding terminal. In addition, when the number of terminals located at the first sub-section is equal to or greater than a preset number, the base station may perform polarization multiplexing by forming the first sub-sector and may transmit data to the terminal location at the first sub-sector using the first beam and the second beam.

Figure 13:
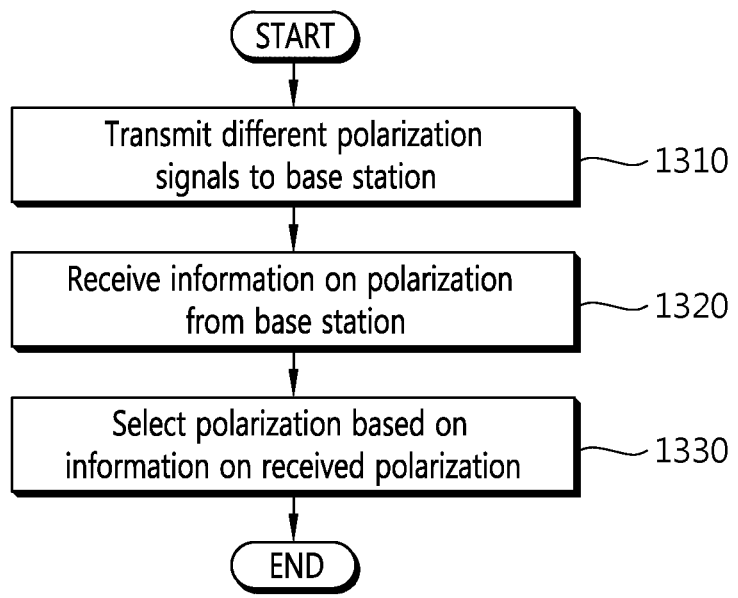
FIG. 13 is a flowchart illustrating a transmitting/receiving method by a terminal according to an embodiment of the present invention.

FIG. 13 is a flowchart illustrating a transmitting/receiving method by a terminal according to an embodiment of the present invention.

A terminal may transmit different polarization signals, that is, a first polarization signal and a second polarization signal to the base station using at least one antenna in order to report a location and a moving direction of the terminal to the base station while communicating with the base station with the same polarization at a specific sub-sector (1310). In this case, the base station may estimate a location and a moving direction of the terminal based on the first polarization signal and the second polarization signal and select specific polarization to transmit information on the selected polarization to the terminal. In this case, the second polarization signal may be a cross polarization signal of the first polarization.

When receiving the information on the selected polarization from the base station (1320), the terminal may select polarization for receiving data based on information on the received polarization (1330). For example, the terminal may receive data with two different polarizations by selecting polarization indicated by information on the received polarization or selecting both of the first polarization and the second polarization.

Figure 14:
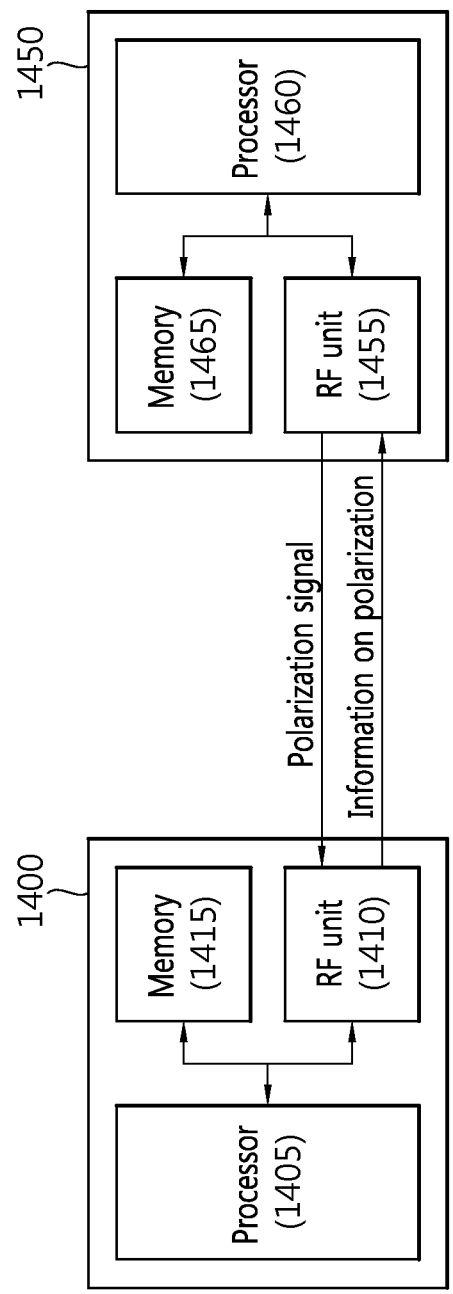
FIG. 14 is a block diagram illustrating a base station and a terminal according to an embodiment of the present invention.

FIG. 14 is a block diagram illustrating a base station and a terminal according to an embodiment of the present invention.

Referring to FIG. 14, the base station 1400 includes a processor 1405, a radio frequency (RF) unit 1410, and a memory 1415. The memory 1415 is connected to the processor 1450, and stores various information for driving the processor 1405. The RF unit 1410 is connected to the processor 1405, and sends and receives radio signals. For example, the RF unit 1410 may receive a first polarization signal and a second polarization signal from the terminal 1450. Further, the RF unit 1410 may transmit information on polarization selected by the base station according the present invention to the terminal 1450.

The processor 1405 control so that all operations illustrated in FIG. 12. For example, the processor 1405 control to form multiple beams, estimates a location and a moving direction of the terminal, and selects polarization of a beam to be formed with respect to each terminal. In addition, the processor 1405 generates information on the selected polarization to transmit the information to a corresponding terminal.

The memory 1415 may store received signal strength indicator (RSSI) information of the polarization signal, location information and moving direction information of the terminal, and provide the information to the processor 1405 according to a request from the processor 1405.

Further, the terminal 1450 includes an RF unit 1455, a processor 1460, and a memory 1465. The memory 1465 is connected to the processor 1460, and stores various information for driving the processor 1460. The RF unit 1455 is connected to the processor 1460, and sends and receives radio signals. The RF unit 1455 may include antennas and modules shown in FIG. 7 or FIG. 9. The processor 1460 controls so that all operations of FIG. 13 are performed. The processor 1460 controls transmission of the first polarization signal and the second polarization signal and selects polarization based on information on the polarization received from the base station.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A transmitting method of a base station in a wireless communication system, the method comprising:
   configuring a first parameter for forming a first beam having first polarization with respect to a terminal located in a first sub-sector, and configuring a second parameter for forming a second beam having second polarization with respect to a terminal located in a second sub-sector; and
   transmitting a signal to each terminal by forming the first beam using at least one antenna based on the configured first parameter and forming the second beam using the at least one antenna based on the configured second parameter,
   wherein a frequency band equal to a frequency band of the first sub-sector is allocated to the second sub-sector in a cell in the base station, and selecting a polarization of a beam to be formed with respect to at least one terminal based on an estimated location and moving direction of the at least one terminal.

2. The method of claim 1, wherein the second polarization is a cross polarization of the first polarization.

3. The method of claim 1, wherein the first beam and the second beam are fixedly formed at the first sub-sector and the second sub-sector, respectively, and when the terminal located in the first sub-sector moves to the second sub-sector, the first beam formed with respect to the terminal located in the first sub-sector is switched to the second beam.

4. The method of claim 1, further comprising receiving a first polarization signal and a second polarization signal from the terminals through the at least one antenna, respectively, after the transmitting of the signal.

5. The method of claim 4, further comprising
estimating locations and moving directions of the terminals based on the first polarization signal and the second polarization signal, respectively; and
selecting polarization of the beam to be formed with respect to the terminals based on the estimated location and moving directions, after the receiving of the first polarization signal and the second polarization signal.

6. The method of claim 5, wherein the moving directions are estimated by comparing a received signal strength indicator of the first polarization signal with a received signal strength indicator of the second polarization signal.

7. The method of claim 5, further comprising transmitting information on the selected polarization to the terminals, respectively after the selecting of the polarization of a beam.

8. The method of claim 5, further comprising moving the beam formed with respect to the terminals based on the estimated locations and moving directions after the estimating of the locations and moving directions of the terminals.

9. The method of claim 4, further comprising:
measuring a received signal strength indicator of the first polarization signal and a received signal strength indicator of the second polarization signal; and
forming the first beam and the second beam with respect to a corresponding terminal when the received signal strength indicator of the first polarization signal and the received signal strength indicator of the second polarization signal are equal to or greater than a preset received signal strength indicator, after the receiving of the first polarization signal and the second polarization signal.

10. The method of claim 1, wherein the transmitting of the signal comprises forming the second beam in the first sub-sector to transmit data to the terminal located in the first sub-sector using the first beam and the second beam when the number of terminals located in the first sub-sector is equal to or greater than a preset number.

11. The method of claim 1, wherein a frequency band different from the frequency band is allocated to a cell adjacent to the cell.

12. A base station in a wireless communication system, comprising:
a processor which configures a first parameter for forming a first beam having first polarization with respect to a terminal located in a first sub-sector, and configures a second parameter for forming a second beam having second polarization with respect to a terminal located in a second sub-sector;
a memory to store the first parameter and the second parameter and
a radio frequency (RF) unit which transmits a signal to each terminal by forming the first beam using at least one antenna based on the configured first parameter and forming the second beam using the at least one antenna based on the configured second parameter,
wherein a frequency band equal to a frequency band of the first sub-sector is allocated to the second sub-sector in a cell in the base station , and selecting a polarization of a beam to be formed with respect to at least one terminal based on an estimated location and moving directions of the at least one terminal.

13. The base station of claim 12, wherein the RF unit receives a first polarization signal and a second polarization signal from the terminals through the at least one antenna.

14. The base station of claim 13, wherein the processor estimates locations and moving directions of the terminals based on the first polarization signal and the second polarization signal, respectively.

15. The base station of claim 14, wherein the moving directions are estimated by comparing a received signal strength indicator of the first polarization signal with a received signal strength indicator of the second polarization signal.

16. The base station of claim 14, wherein the RF unit transmits information on the selected polarization to the terminals, respectively.

17. The base station of claim 13, wherein the processor measures a received signal strength indicator of the first polarization signal and a received signal strength indicator of the second polarization signal; and forms the first beam and the second beam with respect to a corresponding terminal when the received signal strength indicator of the first polarization signal and the received signal strength indicator of the second polarization signal are equal to or greater than a preset received signal strength indicator.

18. A method for receiving of a terminal in a wireless communication system, comprising:
transmitting a first polarization signal and a second polarization signal to a base station using at least one antenna;
receiving information on selected polarization based on the first polarization signal and the second polarization signal from the base station;
selecting polarization for receiving data based on the information on the polarization, and wherein polarization is selected based on an estimated location and moving direction of the terminal; and
receiving a signal using the selected polarization.

19. The terminal of claim 18, wherein the second polarization is a cross polarization of the first polarization.

* * * * *